United States Patent Office 3,199,221
Patented Aug. 10, 1965

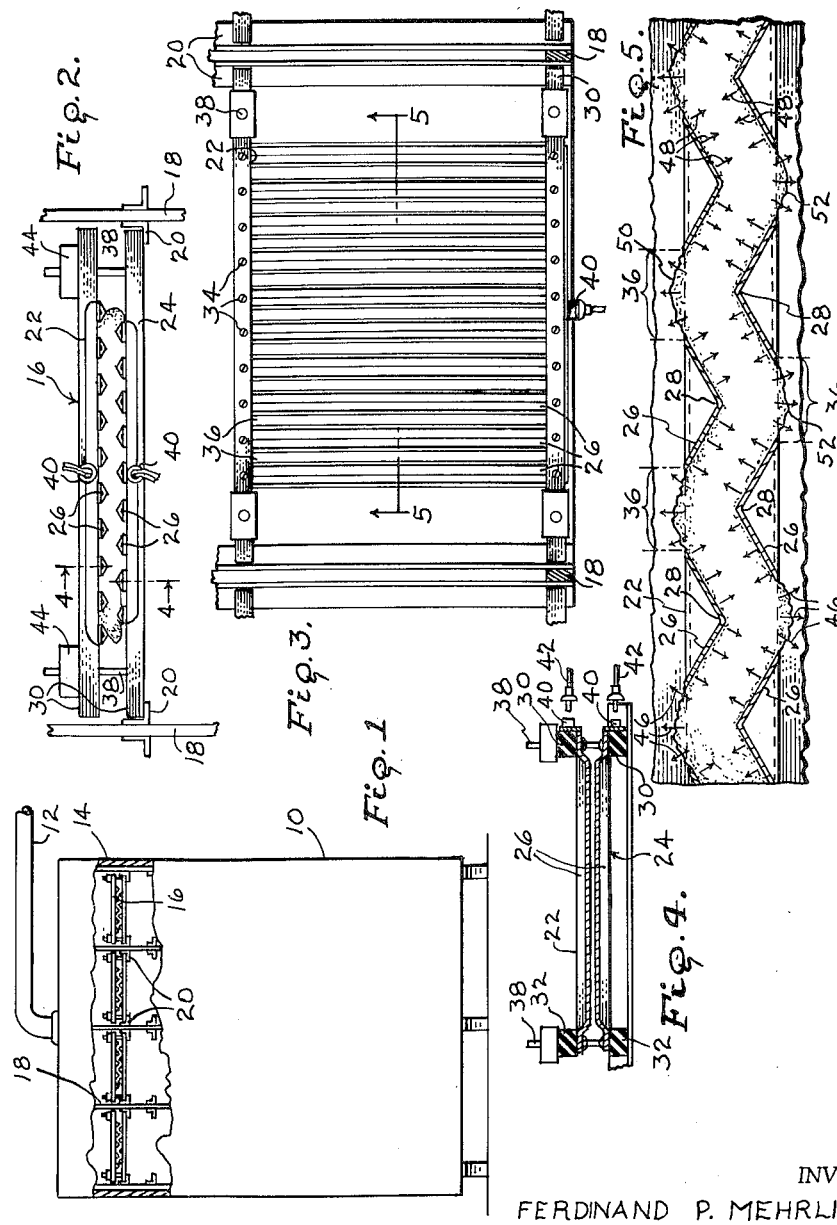
INVENTORS
FERDINAND P. MEHRLICH
RAYMOND R. HAUGH though the shelves can be accurately regulated. Moreover, the time required to freeze dehydrate with apparatus of the type described above is excessive, thereby adding considerably to the cost.

3,199,221
APPARATUS FOR USE IN FREEZE DEHYDRATION
Ferdinand P. Mehrlich, Wilmette, and Raymond R. Haugh, Chicago, Ill., assignors to the United States of America as represented by the Secretary of the Army
Original application Apr. 5, 1961, Ser. No. 101,032, now Patent No. 3,169,070, dated Feb. 9, 1965. Divided and this application Apr. 20, 1962, Ser. No. 196,021
1 Claim. (Cl. 34—145)
(Granted under Title 35, U.S. Code (1952), sec. 266)

This application is a division of our copending application Serial Number 101,032, filed April 5, 1961, for "Apparatus and Method for Use in Freeze Dehydration."

The invention described herein, if patented, may be manufactured and used by or for the Government for governmental purposes, without the payment to us of any royalty thereon.

The present invention relates to the freeze dehydration of permeable moisture containing materials such as meat and more particularly to an improved method for freeze dehydrating such materials and to improved apparatus for shaping, holding and heating materials to be freeze dehydrated.

To avoid confusion, the improved apparatus of the present invention will be called a heater rack herein.

In the freeze dehydration of foodstuffs, such as meat, which are permeable and which contain a large percentage of moisture or water, the meat or other foodstuff commonly is placed in open pans which are supported on banks or tiers of shelves housed in a vacuum chamber. Customarily the pans and the material contained therein are heated by the conduction of heat from the supporting shelves. To supply this heat, the shelves may be of hollow construction, and they may be heated by circulating water through the same which has previously been heated to the proper temperature to heat the pans and the material contained therein the required amount. Several disadvantages are inherent in this apparatus among which are uneven heating of the pans, the difficulty in accurately regulating and varying the amount of heat supplied to the material under treatment and in cleaning the apparatus and the high cost of the process as presently carried out which results directly from the length of time it takes to carry out the process.

Accurate control of the temperature to which the material to be freeze dehydrated is subjected is important to prevent overheating of the dried portion of this material and consequent damage thereto during the desiccating process. Prevention of overheating and hence softening or melting of undesiccated frozen part of the material is also important because this would likewise result in damage to and deterioration of the finished product. Only enough heat should be supplied to this material to cause the moisture in the same to be sublimated along the ice phase boundary or evaporating front thereof. This boundary or front moves inwardly from the exterior of the material as the dehydration thereof proceeds.

The material under treatment is likely to be unevenly heated in conventional apparatus, not only because the hot water or other heating fluid circulated through the hollow shelves looses heat between the inlet and outlet ends of the shelves thus causing the pans to be unevenly heated from one side thereof to the other, but also because of the fact that passage of heat from the shelves to the trays increases the length of the path over which heat must be conducted, and, since both the shelves and the trays are heated, an additional quantity of heat is required for this purpose. In addition, the contact between these parts may be uneven thus increasing the amount of heat required to carry out the process and further tending toward uneven heating of the trays. These factors are bound to interfere with accurate control of the temperature to which the pans or trays are heated even if the temperature of the heating fluid circulated through the shelves can be accurately regulated. Moreover, the time required to freeze dehydrate with apparatus of the type described above is excessive, thereby adding considerably to the cost.

Existing apparatus of the type above mentioned is hard to keep clean because it cannot readily be disassembled, due to the fact that the hollow shelves are fixed in position and must be fixedly connected to inlets and outlets for the heating fluid. The improved apparatus of the present invention is designed to obviate these disadvantages of existing freeze dehydration apparatus and thereby reduce the cost of freeze dehydration by shortening the time required to carry out freeze dehydration operations, by reducing the amount of heat dissipated and by making the job of maintenance easier without sacrifice of accuracy in the control of the heat supplied to the material under treatment, and, as a matter of fact, with an increase in the accuracy of control.

Accordingly, an object of the invention is to provide a new and improved thermoelectrically heated rack for use in the freeze dehydration of permeable moisture containing materials such as meat.

Another object of the invention is to provide a new and improved heater rack for use in the freeze dehydration of permeable moisture containing materials which includes thermoelectric heating elements that directly contact the material and that shape and compress portions of the material and support the same during freeze dehydration thereof.

A further object of the invention is to provide a new and improved rack or holder for shaping, holding and heating materials to be freeze dehydrated in a vacuum chamber which rack directly applies heat and pressure to portions of the material during freeze dehydration while other portions remain directly exposed to the vacuum in the chamber so as to facilitate the escape of moisture in vaporized form from the material along the exposed portions thereof.

A still further object of the invention is to provide a new and improved rack or holder for shaping, holding and heating materials to be freeze dehydrated as set forth in the preceding object which shapes the material while unfrozen so as to flex or stretch out the same along the exposed areas thereof thereby to facilitate the escape of vaporized moisture along these areas during freeze dehydration.

Another object of the invention is to provide a new and improved rack or holder for shaping, holding and heating material to be freeze dehydrated which may readily be dismantled for cleaning and sterilization.

Yet another object of the invention is to provide a new and improved method for freeze dehydrating permeable moisture containing materials by the practice of which escape of vaporized moisture from the material is facilitated and a more accurate control of the heat input to the material is possible so that the time it takes to desiccate a product using this method is about halved and a product of more uniform and better all-around quality is obtained.

A more specific object of the invention is to provide a new and improved rack or holder for shaping, holding and heating material to be freeze dehydrated comprising superposed tiers each including a plurality of thermoelectric heating elements of angle shape in transverse section disposed to define a material holding space therebetween of substantially sinusoidal or undulatory shape in transverse section.

Another specific object of the invention is to provide new and improved apparatus and a method particularly adapted for use in the freeze dehydration of meat.

A general object of the invention is to provide a new and improved rack or holder for shaping, holding and heating permeable moisture containing materials to be freeze dehydrated which is simple and inexpensive in construction, easy to use, clean and maintain and which while reducing the time for sublimation of the moisture from the material by reducing the distance heat must be conducted to reach the vapor phase boundary or evaporating front in the material and that vapor must travel to escape the material, nevertheless, heats the material more uniformly thereby insuring production of a more uniformly desiccated product.

These and other objects, advantages and capabilities of the invention will be become apparent from the following description in which reference is had to the accompanying drawing wherein:

FIG. 1 is a fragmentary view of a freeze dehydrating apparatus showing a vacuum chamber partly broken away more clearly to show the interior thereof;

FIG. 2 is a front elevational view of the improved heater rack of the present invention and a portion of the supporting structure for the same;

FIG. 3 is a top plan view of the heater rack and a portion of the structure for supporting the same in the vacuum chamber;

FIG. 4 is a vertical longitudinal sectional view taken on the line 4—4 of FIG. 2; and FIG. 5 is an enlarged fragmentary vertical transverse sectional view through a portion of the heater rack of the present invention taken along the line 5—5 on FIG. 3.

Referring to the drawings, and more particularly to FIG. 1, a vacuum chamber 10 is there shown which is partly broken away better to show the interior thereof. This chamber which may be part of a conventional freeze dehydration assembly line may be connected to an evacuating pump of known construction (not shown) through a conduit 12, and it may have a door (not shown) through which may be admitted a portable supporting rack 14 for supporting in spaced stacks a plurality of the improved heater racks of the present invention indicated in their entirety by the number 16.

The supporting rack 14 comprises a framework including rigidly spaced vertically extending fore and aft upright frame members, the front frame members being numbered 18 in FIGS. 1 and 2. Rigidly fixed to and supported by the fore and aft upright frame members are a series of angle shaped track forming members or slides 20 arranged in opposed pairs at uniformly vertically spaced intervals. The opposed pairs of track forming slides 20 are each designed to support a heater rack 16, the opposite ends of the heater rack resting upon opposed track forming slides as shown in FIGS. 1 and 2 so that the heater racks may readily be slidably moved into position upon any pair of opposed slides 20 or removed therefrom.

As best seen in FIGS. 2 and 5, each heater rack 16 comprises opposed upper and lower tiers 22 and 24, respectively, each including a series of substantially duplicate thermoelectric heating elements 26 of angle shape in transverse cross section, the angle between the sides of each heating element preferably approximating 120° and the sides being joined along an apex 28. The heating elements 26 in each tier 22 and 24 are rigidly fixed at opposite ends thereof to front and back crosspieces 30 and 32 (FIG. 3), respectively, by means of bolts 34 (FIG. 3) or any other suitable means, the heating elements 26 in each tier being disposed in side-by-side or parallel relation uniformly spaced from each other laterally so as to define slots 36 (FIG. 5) between the contiguous or opposed edges of adjacent heating elements 26. As best seen in FIG. 4, the front and rear ends of the heating elements 26 preferably are bent or formed so as to locate the apexes 28 of the heating elements in a plane spaced outwardly somewhat from the plane of the front and back crosspieces 30 and 32. The heating elements 26 preferably are formed of stainless steel of sufficient resistance to the passage of current to become heated to the proper temperature when they are connected into an electrical circuit. In view of the direct mounting of the thermoelectric heating elements 26 upon the front and back crosspieces 30 and 32, respectively, the latter preferably are made from any suitable electrical and thermal insulating material.

By reference to FIG. 5, it will be noted that corresponding heating elements 26 in one tier of the heater rack 16, for example, the upper tier 22, are laterally offset with respect to those in the lower tier 24 by an amount sufficient longitudinally to center the heretofore mentioned slots 36 in this upper tier with respect to the apexes 28 of the heating elements 26 in the lower tier 24. This also results in the corresponding slots 36 between the opposed edges of adjacent heating elements 26 in the lower tier 24, likewise, being substantially centered with respect to the apexes 28 of the heating elements 26 in the upper tier 22 and the slots 36 in the upper and lower tiers being disposed in laterally offset or staggered relation to each other. The purpose of this staggered relationship will be explained in detail hereinafter.

In order to insure that the heating elements 26 in the upper and lower tiers 22 and 24 maintain the aforesaid offset relationship when the upper and lower tiers are assembled in the superposed operative relationship, aligning rods or bolts 38 are provided. These rods may be rigidly fixed adjacent the opposite ends of the front and back crosspiece 30 and 32, respectively, in the lower tier 24 to project upwardly therefrom, and the front and back crosspieces in the upper tier 22 may be provided with apertures to receive the aligning rods 38, as shown in FIG. 4, the apertures being so located that the upper tier 22 will assume a position relative to the lower tier 24 when engaged upon these rods at which the corresponding slots 36 in the upper and lower tiers will be located in the desired staggered relationship heretofore mentioned.

The separate heating elements in each tier may be electrically connected by conventional connecting means and may be connected to a socket 40 on the front end of the tiers as shown more or less diagrammatically in FIGS. 3 and 4. Each of these sockets in turn is connected to a suitable source of current through a lead 42 disconnectable from the socket 40 to permit the individual heater racks 16 to be loaded upon or unloaded from the supporting rack 14. The leads 42 for the individual tiers may be connected to a source of current in any suitable manner which will permit the supporting rack 14 loaded with heater racks 16 to be moved as a unit into or out of the vacuum chamber 10. For example, the leads 42 for the separate tiers may all be plugged into common current carrying conductors on the supporting rack 14 or on the walls of the vacuum chamber 10 which conductors in turn are connected to a source of current through suitable circuits. The latter may include suitable conventional controls and indicating or recording equipment to control the temperature to which the heating elements 26 are heated and the duration of a heating cycle so that the cycle of operation may be varied as desired. Since equipment of this type and circuits for controlling the duration and the frequency of operation of electrically operated devices are well known to those skilled in the art and may readily be varied by the latter to accommodate for desired variations in operating procedures or cycles, a detailed disclosure thereof is not believed to be necessary and has not been made herein.

Briefly to describe the method of using the improved heater rack 16 of the present invention, the construction of a particular rack in accordance with the invention and the manner in which it was used will be described. This heater rack included an upper tier 22 consisting of 10 duplicate stainless steel heating elements 26 of angle shape in cross section each 18″ long, ⅞″ wide at the base .0179″ thick and a lower tier including 9 similar heating elements. The separate heating elements 26 in each tier were disposed in parallel relation with the contiguous or opposed edges of adjacent heating elements laterally spaced to define slots 36 approximately ½" wide between these opposed edges, and the heating elements in the upper tier 22 were laterally offset with respect to those in the lower so as to center the apexes 28 of the heating elements 26 in one tier longitudinally relative to the slots 36 in the other (when the tiers were disposed in superposed relation).

When using this heater rack to dehydrate meat, such as steak, for example, the steak should be in the form of slices approximately ½" thick. These slices are placed on the lower tier 24 in unfrozen condition, and the upper tier 22 then slidably engaged upon the aligning rods 38 and pressed downwardly by means of weights 44 (FIG. 2) or any other suitable means capable of imposing a pressure of approximately 2 pounds per square inch on the steak. The resultant compressing force on the steak causes it to conform to the shape of the space between the upper and lower tiers as shown in FIG. 5 and to be reduced in thickness from ½" to approximately ⅜", at least between the opposed sides of the superposed upper and lower heating elements 26. From this view it will be observed that the unfrozen steak is forced into an undulatory shape by the upper and lower tiers 22 and 24 thereby to form or define a first series of upwardly directed apical portions or peaks 50 as viewed in FIG. 5 and a second series of downwardly directed apical portions or peaks 52. The capacity of the heater rack 16 constructed and loaded as above described ranges between 2 and 3 pounds of steak.

In accordance with the improved method of the present invention, after loading of the heater racks 16 the steaks are frozen by placing the latter in a conventional blast freezer where the steak is subjected to about −30° F. for about four hours. The frozen steaks are then dehydrated in a vacuum chamber similar to the chamber 10 (FIG. 1) under an initial 3 mm. pressure and later a 500 micron pressure at which pressures the frozen moisture will sublime directly to vapor. During this step in the improved method of the present invention, the thermoelectric heating elements are energized by a current of, for example, 20 amps at 10 volts. This causes these elements and the dehydrated portion of the steak to become heated to a temperature of approximately 200° F., automatic control equipment of conventional construction being provided as previously explained automatically to reduce the current as this temperature is approached so as not to cause overheating. The heat thus furnished amounts approximately to the latent heat of vaporization of the frozen moisture in the steak. The slides 20 in the supporting rack 14 should be vertically and laterally spaced as shown in FIG. 1 so that vaporized moisture can readily escape from around the heater racks 16.

Among the advantages of the present invention are the fact that the escape of moisture from steaks or the like loaded in heater racks 16 constructed as disclosed herein is facilitated due to the fact that the steak is exposed along the slots 36, and it is flexed or stretched in these exposed apical or peak areas 50 and 52 due to the fact that there is an apex 28 of a heating element 16 longitudinally centered with respect to each slot 36. This causes the steak to be opened up along these areas 50 and 52 for the easier escape of vaporized moisture, and the slots 36 being relatively wide and closely spaced provide a wide area for escape of moisture from the heater rack 16 and shorten the path over which the moisture must travel to escape as indicated by the arrows 46 in FIG. 5. This is particularly true in view of the staggered relation of the slots 36 in the upper and lower tiers 22 and 24, respectively, since it leaves the major portion of the area of the steak exposed to the direct escape of moisture from either the top or bottom thereof.

It will also be noted in FIG. 5 that the heating elements 26 directly contact the meat. This direct contact between the heating elements and the meat shortens the path along which transfer of heat must occur as indicated by arrows 48. By virtue of the shortened path of travel for both the escape of vaporized moisture from the meat in the heater rack of the present invention and the transfer of heat thereto, more efficient operation is obtained which cuts the time of freeze dehydration by at least one half the time required by known apparatus thus greatly reducing the cost of the process.

While a preferred embodiment of the invention has been shown and described, it will be apparent that variations and modifications thereof may be made without departing from the underlying principles of the invention. It is desired, therefore, by the following claim, to include within the scope of the invention, all such variations and modifications by which substantially the results of the invention may be obtained through the use of substantially the same or equivalent means.

We claim:

A combined heater and rack for use in the freeze dehydration of meat or similar permeable materials containing moisture, comprising a vacuum chamber having upright frame members therein, slide members arranged in opposed pairs on said frame members, said slides spaced vertically apart the distance required for efficient escape of the frozen moisture from the material to be dehydrated, opposed removable tiers interposed on said slides, electric heating elements in each of said tiers in opposed and interfitting relation, means operative against each of said tiers to compress the sandwiched material into an undulating shape with substantially uniform force, said electric heating elements sufficiently energized only for the more efficient removal of the frozen moisture from the sandwiched material in a materially shorter period.

References Cited by the Examiner

UNITED STATES PATENTS

| | | | |
|---|---|---|---|
| 2,018,698 | 10/35 | Allen | 219—19.14 |
| 2,652,766 | 9/53 | Cralle | 99—349 |
| 2,788,427 | 4/57 | Prestone | 219—41.2 |
| 2,905,077 | 9/59 | Del Francia | 219—35.1 |
| 2,930,139 | 3/60 | Brynko | 34—5 |

ROBERT A. O'LEARY, *Primary Examiner.*

NORMAN YUDKOFF, *Examiner.*